United States Patent
Virani et al.

(10) Patent No.: US 9,979,679 B2
(45) Date of Patent: *May 22, 2018

(54) SYSTEM AND METHOD FOR ENABLING APPLICATIONS TO COMMUNICATE USING A PEER-TO-PEER (P2P) SYSTEM

(71) Applicant: BlackBerry Limited, Waterloo (CA)

(72) Inventors: Barket Virani, Mississauga (CA); Michael Hin Kai Hung, Toronto (CA)

(73) Assignee: BlackBerry Limited, Waterloo, Ontario (CA)

(*) Notice: Subject to any disclaimer, the term of this patent is extended or adjusted under 35 U.S.C. 154(b) by 343 days.

This patent is subject to a terminal disclaimer.

(21) Appl. No.: 14/297,994

(22) Filed: Jun. 6, 2014

(65) Prior Publication Data
US 2014/0289347 A1    Sep. 25, 2014

Related U.S. Application Data

(63) Continuation of application No. 13/279,899, filed on Oct. 24, 2011, now Pat. No. 8,762,467.

(60) Provisional application No. 61/406,386, filed on Oct. 25, 2010.

(51) Int. Cl.
*G06F 15/16* (2006.01)
*H04L 12/58* (2006.01)

(52) U.S. Cl.
CPC ............ *H04L 51/04* (2013.01); *H04L 51/046* (2013.01); *H04L 51/12* (2013.01)

(58) Field of Classification Search
CPC ....... H04L 51/04; H04L 51/046; H04L 51/12; H04L 12/582
See application file for complete search history.

(56) References Cited

U.S. PATENT DOCUMENTS 7,065,579 B2    6/2006    Traversat et al.
7,533,168 B1 *  5/2009    Pabla .................... G06F 9/5072
                                                           709/201

(Continued)

FOREIGN PATENT DOCUMENTS

EP    1703453 A2    9/2006
EP    1229442 B1    3/2007

(Continued)

OTHER PUBLICATIONS

Ziade, F.; Search Report from corresponding PCT Application No. PCT/CA2011/001174; search completed Jan. 26, 2012.

(Continued)

*Primary Examiner* — Moustafa M Meky
*Assistant Examiner* — Blake Rubin
(74) *Attorney, Agent, or Firm* — Thomas Grzesik; Fleit Gibbons Gutman Bongini & Bianco P.L.

(57) ABSTRACT

A method and system are provided for enabling applications on a mobile device to utilize a peer-to-peer platform on the mobile device. The method comprises providing an interface between an application and a peer-to-peer (P2P) platform on the mobile device; obtaining data from the application; using the P2P platform to include the data from the application in a P2P message; and sending the P2P message to another mobile device to enable a complementary application on the other mobile device to utilize the data from the application.

23 Claims, 14 Drawing Sheets

(56) References Cited

U.S. PATENT DOCUMENTS

| | | | | |
|---|---|---|---|---|
| 8,009,586 B2* | 8/2011 | Chaturvedi | H04L 29/12528 | 370/254 |
| 8,036,140 B2* | 10/2011 | Rao | G06F 9/465 | 370/254 |
| 8,126,985 B1* | 2/2012 | Kandekar | A63F 13/77 | 345/418 |
| 9,122,698 B2* | 9/2015 | Lacapra | G06F 17/30206 | |
| 2002/0147771 A1 | 10/2002 | Traversat et al. | | |
| 2003/0179867 A1* | 9/2003 | Piepho | H04L 12/2856 | 379/90.01 |
| 2004/0030743 A1* | 2/2004 | Hugly | G06F 9/465 | 709/203 |
| 2004/0103153 A1 | 5/2004 | Chang et al. | | |
| 2004/0255031 A1 | 12/2004 | Nomura et al. | | |
| 2004/0261071 A1* | 12/2004 | Chuang | G06F 8/65 | 717/170 |
| 2005/0021398 A1* | 1/2005 | McCleskey | G06Q 30/02 | 705/14.47 |
| 2005/0071745 A1* | 3/2005 | Ehrich | H04L 67/02 | 715/200 |
| 2005/0091202 A1* | 4/2005 | Thomas | G06F 17/30867 | |
| 2006/0253584 A1* | 11/2006 | Dixon | G06Q 30/02 | 709/225 |
| 2007/0250582 A1* | 10/2007 | Sidhu | H04L 12/581 | 709/206 |
| 2007/0250922 A1* | 10/2007 | Horton | H04L 63/0254 | 726/11 |
| 2008/0133650 A1* | 6/2008 | Saarimaki | G06F 8/65 | 709/203 |
| 2009/0063419 A1* | 3/2009 | Nurminen | G06F 17/30817 | |
| 2009/0157814 A1 | 6/2009 | Lee et al. | | |
| 2009/0183151 A1* | 7/2009 | Gharabally | G06F 8/61 | 717/178 |
| 2010/0011060 A1* | 1/2010 | Hilterbrand | G06F 8/65 | 709/204 |
| 2010/0174918 A1* | 7/2010 | Hoffman | G06F 21/6218 | 713/189 |
| 2010/0188975 A1* | 7/2010 | Raleigh | G06Q 10/06375 | 370/230.1 |
| 2010/0251247 A1* | 9/2010 | Pedersen | G06Q 10/06 | 718/102 |
| 2010/0262660 A1* | 10/2010 | Little | H04L 67/24 | 709/206 |
| 2010/0306339 A1* | 12/2010 | Ling | H04L 67/104 | 709/213 |
| 2011/0035503 A1* | 2/2011 | Zaid | H04L 63/0407 | 709/228 |
| 2011/0055320 A1* | 3/2011 | Gillo | H04L 67/1046 | 709/203 |
| 2011/0219423 A1* | 9/2011 | Aad | G06F 21/00 | 726/1 |
| 2012/0042000 A1* | 2/2012 | Heins | G06Q 10/10 | 709/201 |
| 2012/0166516 A1* | 6/2012 | Simmons | H04L 67/1095 | 709/202 |
| 2012/0311614 A1* | 12/2012 | DeAnna | H04L 67/10 | 719/328 |
| 2014/0207844 A1* | 7/2014 | Mayo | H04L 67/34 | 709/203 |
| 2014/0237465 A1* | 8/2014 | Lin | H04L 67/1063 | 717/173 |

FOREIGN PATENT DOCUMENTS

| | | |
|---|---|---|
| EP | 2105872 A1 | 9/2009 |
| EP | 2375635 A2 | 10/2011 |

OTHER PUBLICATIONS

Poggio, F.; Search Report from corresponding European Application No. 11186298.3; search completed Feb. 6, 2012.

* cited by examiner

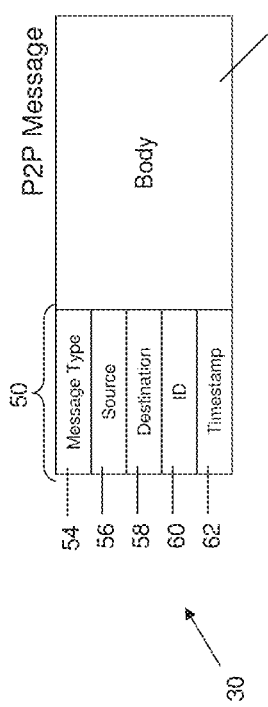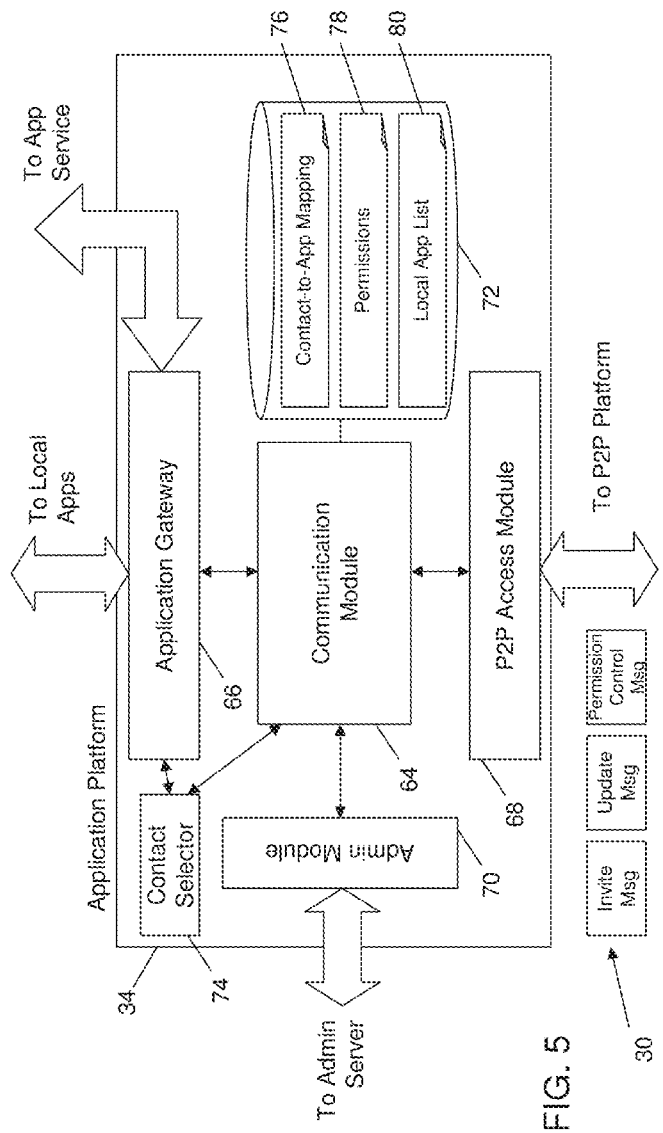

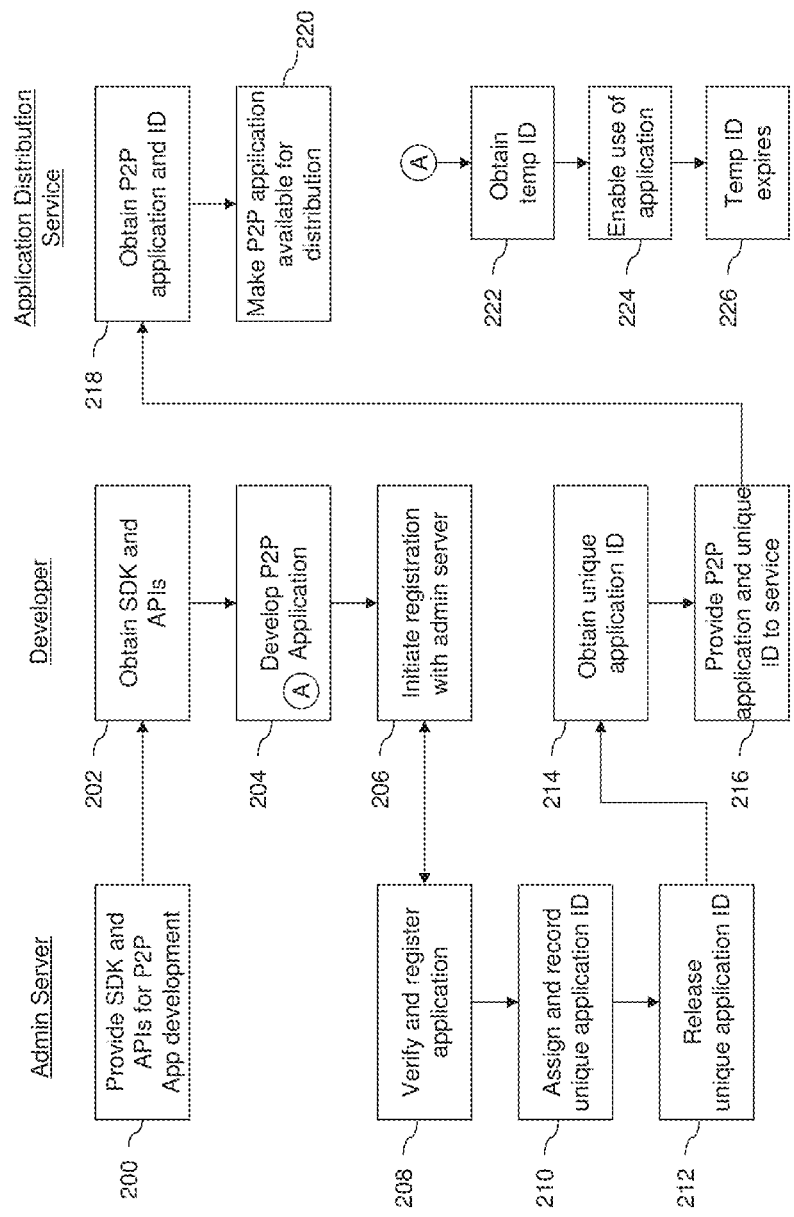

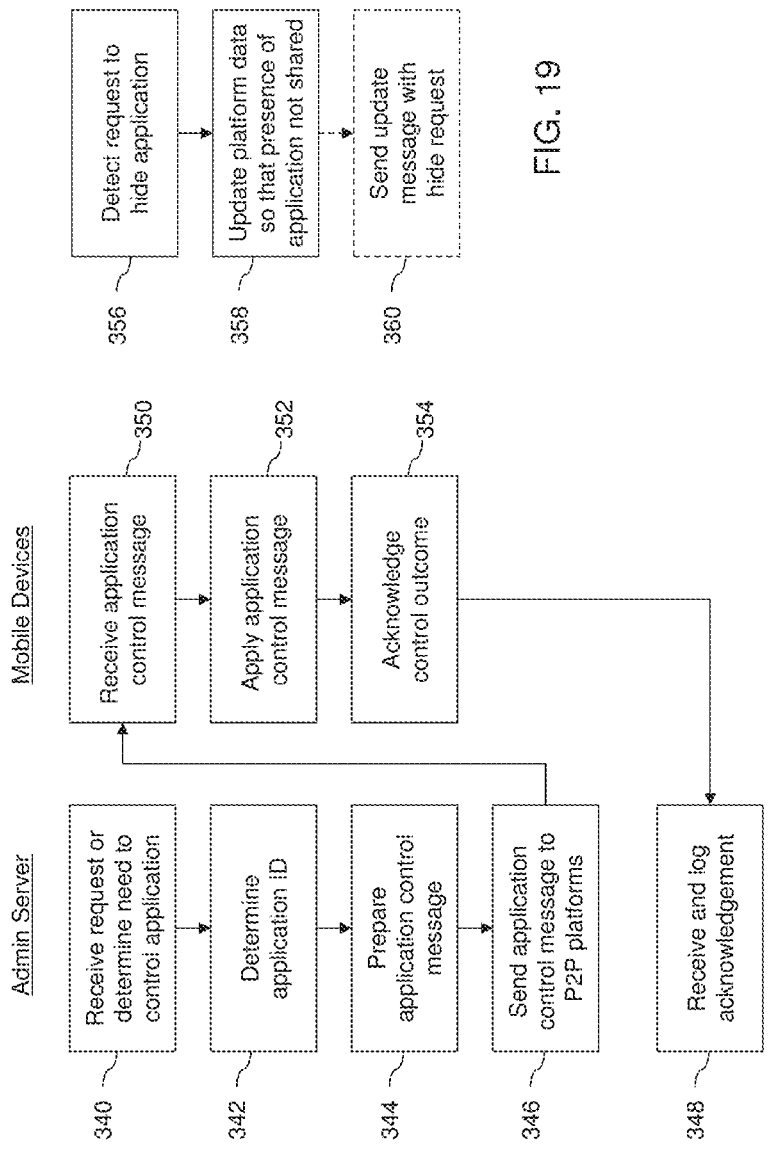

SYSTEM AND METHOD FOR ENABLING APPLICATIONS TO COMMUNICATE USING A PEER-TO-PEER (P2P) SYSTEM

CROSS-REFERENCE TO RELATED APPLICATIONS

This application is a continuation of U.S. patent application Ser. No. 13/279,899 filed Oct. 24, 2011 which claims priority from U.S. Provisional Patent Application No. 61/406,386 filed Oct. 25, 2010, both incorporated herein by reference.

TECHNICAL FIELD

The following relates to systems and methods for enabling applications to communicate using a P2P system.

BACKGROUND

Many applications that can be installed on an electronic communication device involve interactions with other devices. Such applications include, without limitation, multi-player gaming, social media applications, mobile commerce applications, online auctions, file sharing applications, music sharing applications, location based applications, etc.

Typically, the types of applications discussed above are developed such that a central server is used to store a repository of data that is used by the respective applications and, often, to download and install the applications themselves. Such a central server can be seen as burdensome due to the additional administrative overhead, additional network infrastructure and sometimes the need for additional protocols to enable devices to communicate with each other via the server.

BRIEF DESCRIPTION OF THE DRAWINGS

Embodiments will now be described by way of example only with reference to the appended drawings wherein:

FIG. 4 is a block diagram illustrating an example P2P message.

FIG. 5 is a block diagram illustrating further detail of the application platform shown in FIG. 3.

FIG. 8 is a flow chart illustrating an example set of computer executable instructions for enabling an application to be developed and distributed for use on the application platform.

FIG. 9 is a flow chart illustrating an example set of computer executable instructions for obtaining a temporary application identifier (ID) for running an application in a test mode.

FIG. 18 is a flow chart illustrating an example set of computer executable instructions for controlling an application from an administrator server.

FIG. 19 is a flow chart illustrating an example set of computer executable instructions for hiding use of an application on the application platform.

DETAILED DESCRIPTION OF THE DRAWINGS

It has been recognized that network efficient applications can be developed and deployed on electronic communication devices, particularly mobile devices, by enabling such applications to utilize a P2P platform on the device. An application platform is described below, which can interface with the P2P platform on the device to provide access to contacts, user profiles, and P2P messaging capabilities that already exist in the P2P platform. In this way, various applications can be developed on a platform that enables the applications to communicate in a P2P manner without requiring a dedicated central server to maintain both the applications and application specific data.

Figure 1:
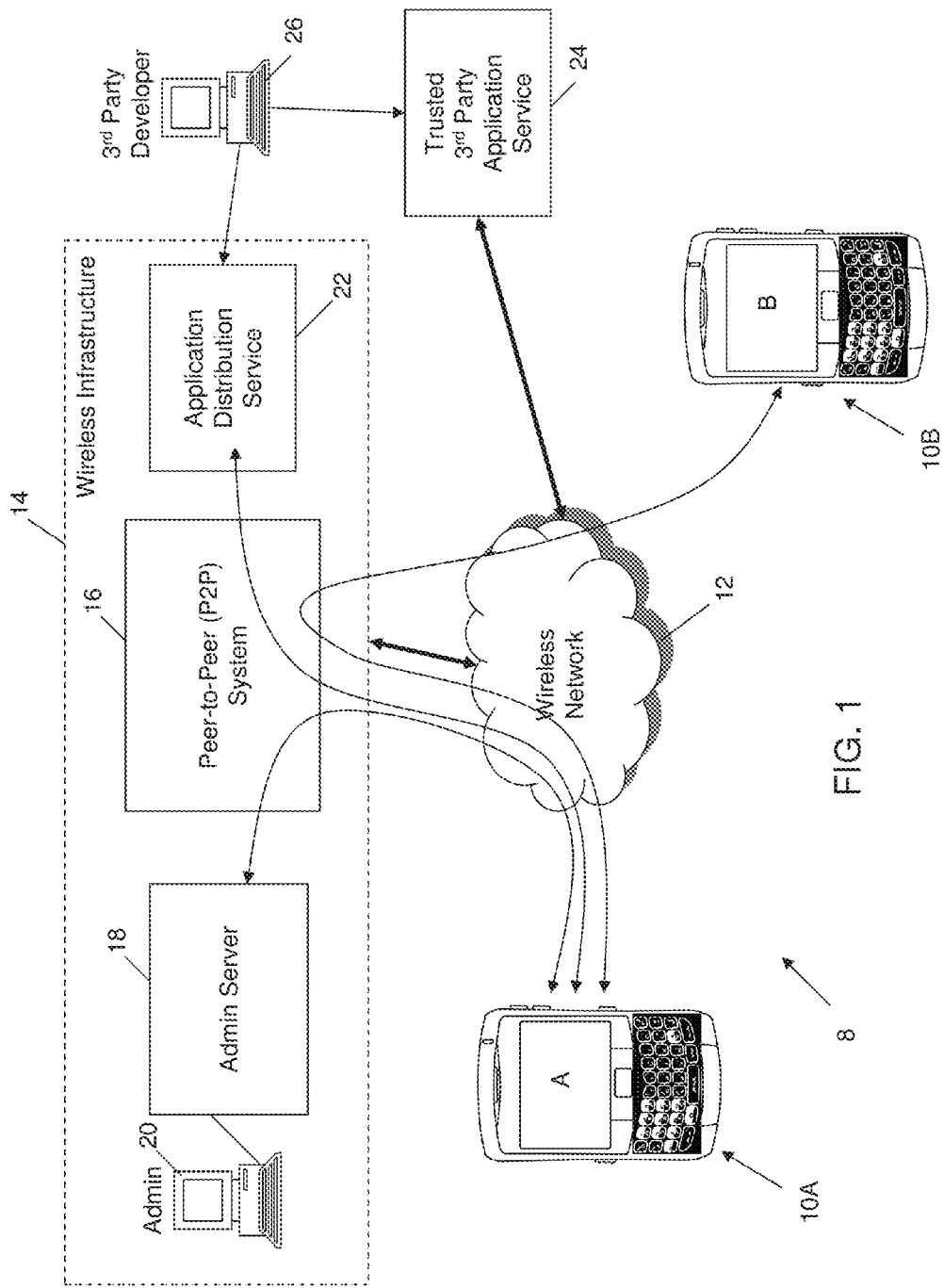
FIG. 1 is a block diagram of an example wireless communication system utilizing a peer-to-peer (P2P) system.

Turning to FIG. 1, an example communication system 8 is shown. The communication system 8 in this example, at least in part, enables mobile devices, commonly referred to by numeral 10 (or using numeral 10 as a prefix—e.g. mobile device A, also denoted by 10A and mobile device B, also denoted by 10B), to communicate via a peer-to-peer (P2P) system 16 via a wireless network 12. It will be appreciated that two mobile devices 10A, 10B shown in FIG. 1 are for illustrative purposes only and many other mobile devices 10 (not shown) may also be capable of communicating with or within the communication system 8. The P2P system 16 is, in this example, a component of a wireless infrastructure 14 associated with the wireless network 12. The wireless infrastructure 14 in this example comprises, in addition to the P2P system 16, an application distribution service 22 that enables mobile devices 10 to download and install applications, and an administration (admin) server 18, which provides administrative access to an administrator (admin) 20, e.g. for controlling various aspects of the communication system 8 and the mobile devices 10, for example, by way IT policies, control messages, and the like.

In addition to the application distribution service 22 which, in this example, is a component of the wireless infrastructure 14, a trusted third party application service 24 may also be accessible to the mobile devices 10 in order to download and install applications developed by 3$^{rd}$ party developers 26. It can be appreciated that, as shown in FIG. 1, the 3$^{rd}$ party developers 26 may also be permitted by the wireless infrastructure 14 to develop and deploy new applications to the application distribution service 22. It can also be appreciated that, although not shown, other 3$^{rd}$ party services may also be capable of developing applications that can be downloaded and installed on the mobile devices 10 and may be verified or otherwise approved for use by the wireless infrastructure 14 and/or mobile device 10.

In the example shown in FIG. 1, the mobile device 10A may communicate with the admin server 18 and vice versa via the P2P system 16, in order to register applications and to enable the admin server 18 to control applications on the mobile device 10A, as will be explained in greater detail below. The mobile device 10A may also communicate with the application distribution service 22 and vice versa via the P2P system 16, in order to download an application to be installed thereon. The mobile device 10A may also communicate with the mobile device 10B and vice versa via the P2P system 16, in order to perform P2P messaging as will be explained in greater detail below. The 3$^{rd}$ party application service 24 in this example may be accessed via the wireless network 12 (e.g. using a browser). As noted above, it has been found that by leveraging a P2P platform on the mobile devices 10, an application platform can be used to enable various applications to exchange data and otherwise utilize the P2P system 16 as a transport mechanism to exchange data between devices 10. For example, the mobile devices 10 may have an existing instant messaging (IM) system that operates using a P2P protocol and this protocol can be made available to other applications which may include, without limitation, multi-player gaming, social media applications, mobile commerce applications, online auctions, file sharing applications, music sharing applications, location based applications etc. By using a P2P system 16 rather than a central server, the applications can perform in a more efficient manner.

Figure 2:
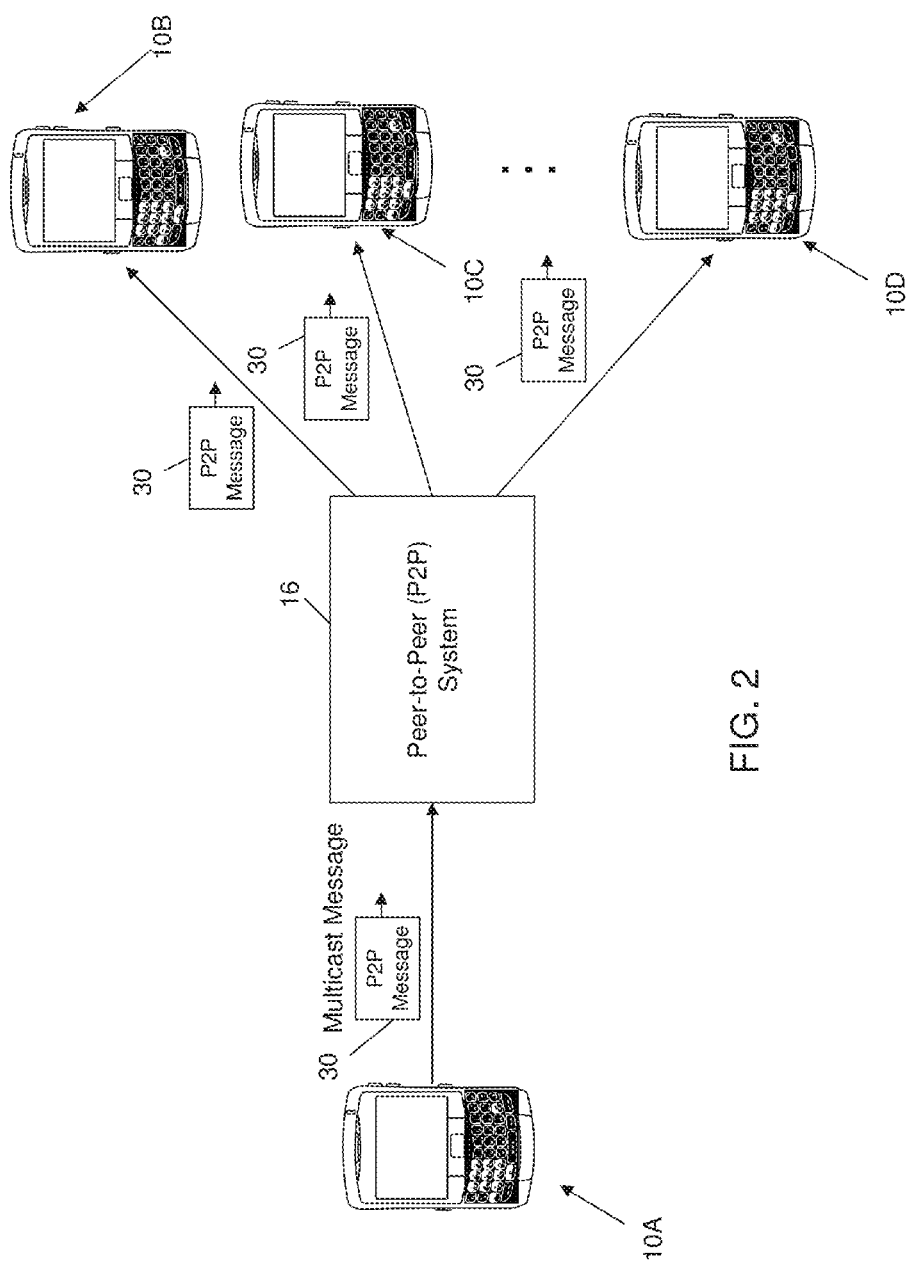
FIG. 2 is a block diagram of an example communication of a one-to-many (1:many) P2P message via the P2P system of FIG. 1.

For example, as shown in FIG. 2, the P2P system 16 can be operable to enable a single P2P message 30 to be sent to multiple recipients by addressing the P2P message 30 to multiple corresponding P2P addresses, and having the P2P system 16 multicast the message 30 to those recipients. In the example shown in FIG. 2 a multicast approach enables the sender (mobile device 10A) to only require one message 30 in order to send the same data to multiple recipients (mobile devices 10B, 10C, and 10D for example). As such, the P2P system 16 not only eliminates the need for a central server and repository to maintain application data, each mobile device 10 can manage such application data for its own sphere of contacts in an efficient manner, in particular by taking advantage of the multicast abilities of the P2P system 16. In other words, each mobile device 10 can be provided with a platform to share information and data with a finite number of other "contacts" whereby collectively, the platforms of all mobile devices 10 provide the capabilities of a central server without requiring the inherent additional network overhead.

Figure 3:
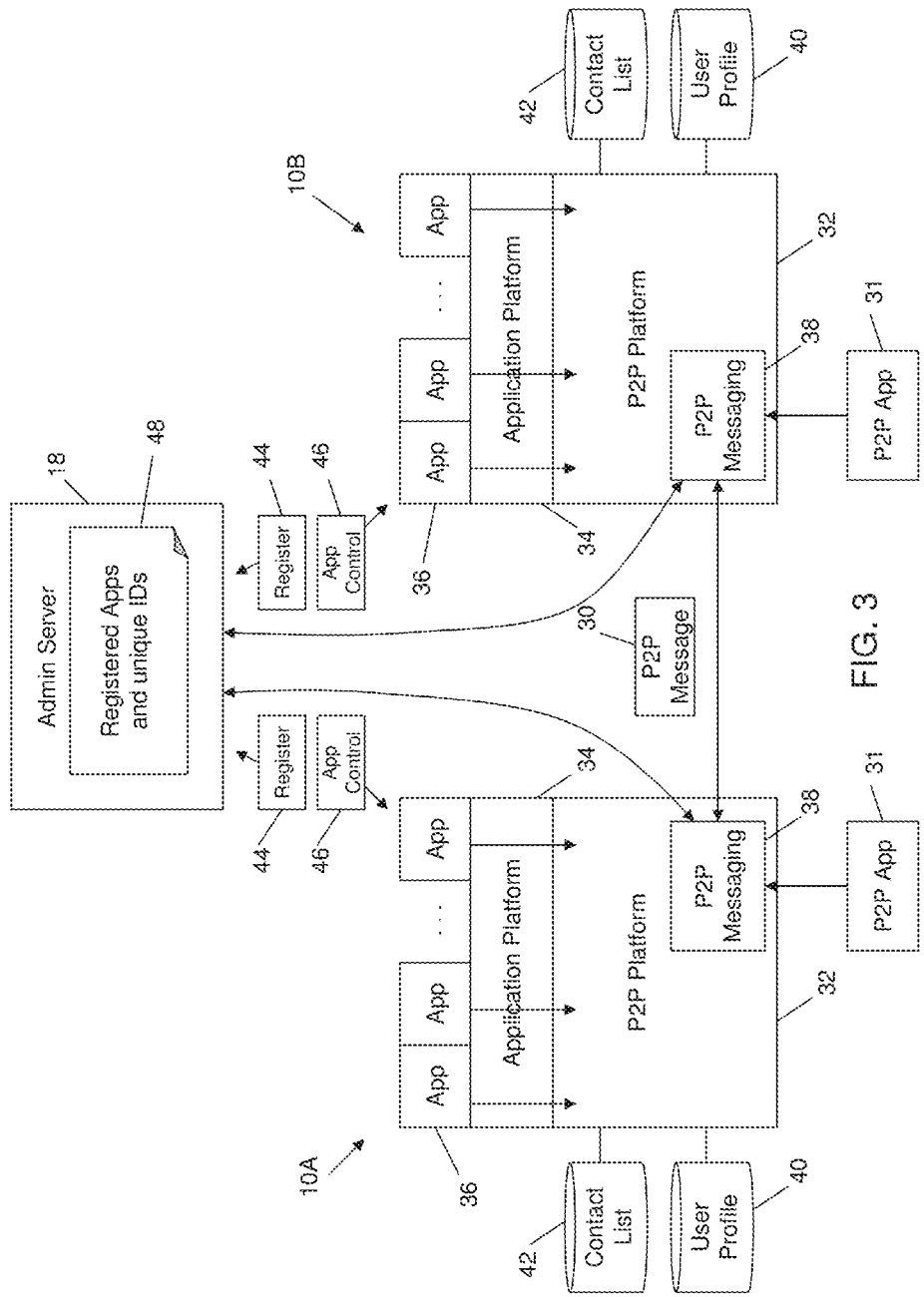
FIG. 3 is a block diagram showing further detail of a portion of the communication system shown in FIG. 1.

Turning now to FIG. 3, an example configuration is shown for enabling applications 36 on each of mobile devices 10A and 10B to access a respective P2P platform 32. In this example, the P2P platform 32 comprises a P2P messaging component or module 38, which enables P2P messages 30 to be sent to corresponding P2P platforms 32 of other mobile devices 10. In this example, the P2P platform 32 is normally utilized by a P2P application 31, e.g. an IM application. The P2P platform 32 also comprises or otherwise has access to a contact list 42 comprising one or more contacts that correspond to other users of a P2P application (e.g. an IM application). The contacts in the contact list 42 are often commonly referred to as "buddies", in particular in IM environments. The P2P platform 32 also comprises user profile data 40 which may include, for example, avatars, status/presence information, a current status message, location, barcode, preferences/options, etc.

An application platform 34 interfaces with the P2P platform 32 (e.g. via one or more application programming interfaces (APIs)) to enable one or more applications 36 to have access to P2P messaging 38, contact list 42, and user profiles 40 managed and used by the P2P platform 32. For example, the P2P platform 32 may be utilized and/or provided by an IM application with the P2P messaging 38 and P2P messages 30 normally providing IM capabilities for communicating with the contacts in the contact list 42. The application platform 34 would then leverage the existing capabilities of the IM platform to use an IM messaging protocol as a transport mechanism for application data. As will be explained in greater detail below, this enables mobile devices 10 to obtain information regarding their contacts with respect to applications 36 on the application platform 34, for example to determine who has what applications. By having the application platforms 34 continually update each other via their respective P2P platforms 32, such information and other "platform data" can be immediately available to the applications 36, even upon installation.

In order to provide some control over the distribution of applications 36 amongst mobile devices 10, e.g. to prevent malicious code from spreading, the application platform 34 may be required to register applications 36 that are downloaded with the admin server 18. As shown in FIG. 3, a register request message 44 can be sent to the admin server 18 by the application platform 34 via the P2P platform 32. The admin server 18 in this example stores a list 48 or other repository of registered applications and associated unique identifiers (IDs) to enable the registration to occur. As will be explained in greater detail below, by assigning a unique ID to each application, upon installing an application 36, the application platform 34 can use the P2P system 16 to provide an application ID for the application whereupon the admin server 18 can verify its credentials and match the ID with those in its list 48. Similarly, the admin server 18 can use the P2P system 16 to send application control messages 46 down to the mobile devices 10 in order to control the applications 36, e.g. to terminate a troublesome application, suspend operation during fixes, apply upgrades, etc. The registration and control messages 44, 46 may therefore typically be considered as being in the same format as the P2P messages 30 and are only shown with different reference numerals for ease of explanation.

A P2P message 30 is shown in greater detail in FIG. 4, and has a format that is particularly suitable for a PIN-to-P1N based system. In a typical P2P protocol 84 (see also FIG. 6), each P2P message 30 has associated therewith a source corresponding to the mobile device 10 which has sent the P2P message 30 and includes a destination identifying the one or more intended recipients. Each P2P message 30 in this example comprises a body 52, which contains the content for the P2P message 30 (e.g. text or other data), and a header 50, which contains various fields used for transmitting and processing each P2P message 30. In this example, the header 50 includes a message type field 54 to specify the type of transmission (e.g. chat, registration, block, presence, etc.), a source field 56 to specify the device address for the sender, a destination field 58 to specify the device address(es) for the one or more intended recipients, an ID field 60 to identify the application 36, 31, and a timestamp field 62 to indicate the time (and if desired, the date) at which the P2P message 30 was sent by the designated sender.

It can be appreciated that in this example, the ID field 60 can be used to specify the application ID to identify an application 36 on the application platform 34, as well as the P2P application 31. Where the P2P platform 32 provides, for example, an IM system, the message type field 54 can also be used to designate an IM communication, and the ID field 60 would then correspond to a conversation ID, i.e. a conversation thread the message 30 corresponds to (e.g. such that each message 30 is identified by the conversation in which it was sent). However, it can be appreciated that the ID field 60 can also be structured to indicate both that an IM application (e.g. P2P application 31) is being used and what conversation it relates to. Therefore, the header fields 54-62 can be used to identify the application, system or platform that is utilizing the P2P message 30 as well as to what device or devices the P2P message 30 is to be sent. In this way, the P2P message 30 and P2P platform 32 can be leveraged to allow other applications installed on the mobile device 10 to operate in a "serverless" manner.

It will be appreciated that other information or attributes may be included in the P2P message 30, such as a subject field (not shown) to enable a subject for part or all of a conversation (in an IM embodiment) to be transported with the P2P message 30 (e.g. to create new subjects, modify subjects, notify others of subjects, etc.), or application details field (not shown) to provide application-specific information such as the version and capabilities of the application.

FIG. 5 illustrates further detail for the application platform 34. The application platform 34 in this example comprises a communication module 64 that is operable to enable the applications 36 to interface with the P2P platform 32. The communication module 64 can communicate with the applications 36 and application distribution service 22 via an application gateway 66, can communicate with the P2P platform 32 via a P2P access module 68, and can communicate with the admin server 18 via an admin module 70. It can be appreciated that if the application platform 34 communicates with the admin server 18 via the P2P system 16, the admin module 70 would also communicate via the P2P platform 32. As such, the configuration shown in FIG. 5, including the particular separation of modules, is for illustrative purposes only. The communication module 64 has access to platform data 72. The platform data 72 in this example includes contact-to-application mappings 76, which indicates which contacts have what applications 36; permissions data 78, which indicate both permissions associated with the user of the mobile device 10 on which the application platform 34 resides, and permissions associated with contacts in the contact list 42; and a local application list 80, which indicates which application(s) the application platform 34 is currently supporting, in order to enable the application platform 34 to update other application platforms 34 associated with the contacts in the contact list 42.

Various message types can be sent as P2P messages 30. As shown by way of example in FIG. 5, these may include invite messages, update messages, and permission control messages (which may also be considered a type of update message). Details of these various message types will be provided below.

In order to protect the platform data 72 and data associated with the contact list 42 from being exposed to the applications 36 supported by the application platform 34 (e.g. PIN numbers), a contact selector 74 can be provided. The contact selector 74 can be provided by the application platform 34 to the applications 36 when an application 36 requires selection of one or more contacts (e.g. to prepare an invitation to join, etc.). In this way, the capabilities and data provided by the P2P platform 32 which enable the application platform 34 to operate can be kept transparent to the applications 36 and users thereof in order to avoid compromising the P2P platform 32 and in turn the P2P system 16 and wireless infrastructure 14. Further details of the contactor selector 74 will be provided later.

Figure 6:
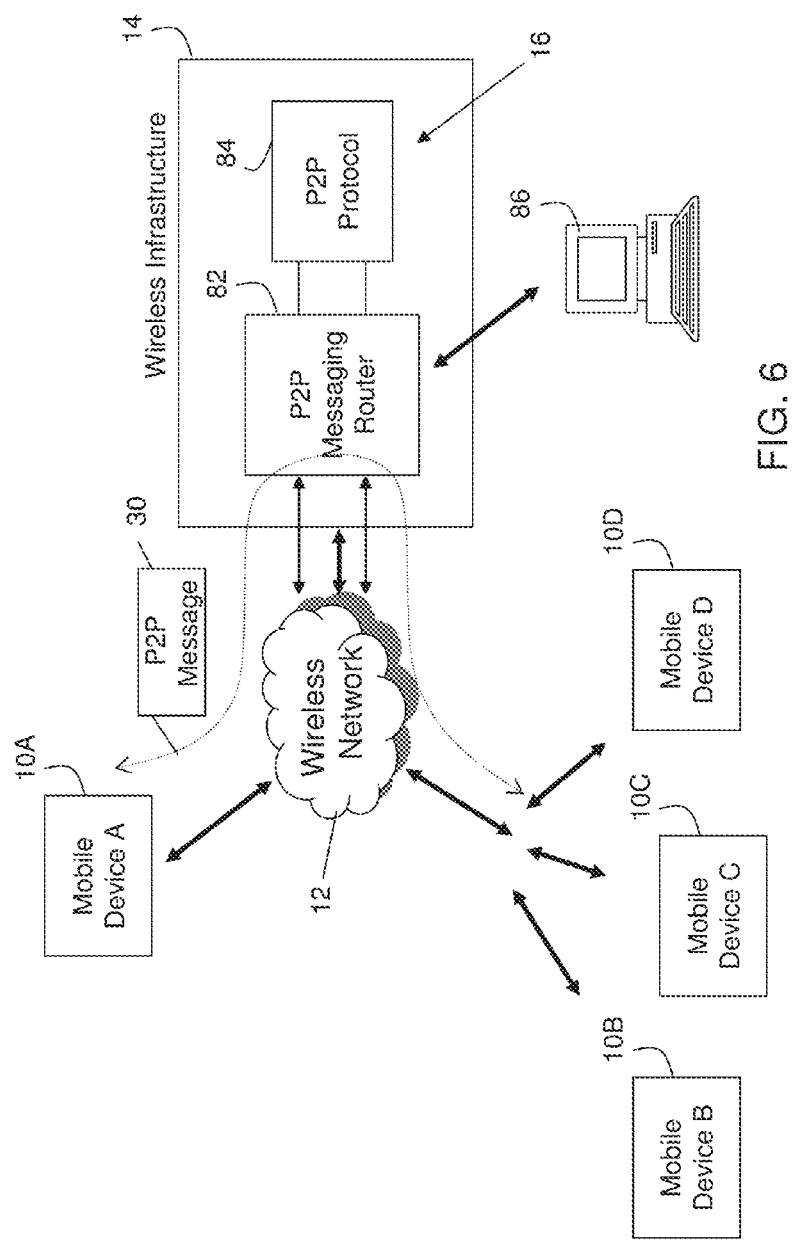
FIG. 6 is a block diagram illustrating one example configuration for the wireless infrastructure and P2P system shown in FIG. 1.

Turning now to FIG. 6, a configuration is shown that is suitable for a user of mobile device A, hereafter referred to as mobile device 10A, to conduct a P2P communication (e.g. instant messaging, application on application platform 34, etc.) with buddies included in their contact list 42. It can be seen in FIG. 6 that the P2P system 16 is incorporated into the wireless infrastructure 14 of the wireless network 12. The P2P system 16 can utilize any suitable P2P protocol 84 operated by a P2P router 82, in this example as part of the wireless infrastructure 14. It can be appreciated however that a stand-alone P2P configuration (i.e. that does not rely on the wireless infrastructure 14—not shown) may equally apply the principles herein. The example configuration shown in FIG. 6 is particularly suitable for implementing a PIN-based messaging system. As can be seen, the P2P messaging router 82 may also enable mobile devices 10 to communicate with desktop computers 86 thus facilitating, for example, communications such as instant messaging (IM) between mobile applications and desktop applications on the desktop computer 86.

In the embodiment illustrated in FIG. 6, a P2P-based messaging system such as a PIN-based messaging system can be implemented using a router-based communication infrastructure, such as one that provides email, SMS, voice, Internet and other communications. Particularly suitable for hosting the P2P messaging router 82, is a wireless router or server used in systems such as those that provide push-based communication services. In FIG. 6, the wireless infrastructure 14 facilitates P2P communications such as instant messaging between mobile device 10A and mobile devices for User B, User C and User D, denoted by 10B, 10C and 10D respectively using the P2P messaging router 82. It will be appreciated that the number of users participating in the example shown in FIG. 6 is for illustrative purposes only. P2P messaging, such as IM, is provided by an associated application stored on each mobile device 10A-10D which can be initiated, for example, by highlighting and selecting an icon from a display as is well known in the art. The P2P messaging router 82 routes messages between the mobile devices 10A-10D according to the P2P protocol 84. For example, the P2P protocol may define a particular way in which to conduct IM or other types of messaging.

In general, in a P2P protocol 84, the sender of the P2P message 30 knows the address of the intended recipient, e.g. a PIN. This may be established when the two devices request to add each other to their respective contact or buddy lists. It can be seen in the example shown in FIG. 6 that mobile device 10A can communicate directly with any of the mobile devices 10B-10D through the P2P messaging router 82 as indicated by the short-dashed line without requiring a dedicated server for facilitating communications. In other words, the P2P messaging router 82 enables the mobile devices 10 to communicate with each other directly over the wireless infrastructure 14 in accordance with the P2P protocol 84.

When conducting a P2P session according to the embodiment shown in FIG. 6, the mobile devices 10A-10D can communicate directly with the wireless infrastructure 14 in a client based exchange where, as noted above, an intermediate server is not required. A P2P message 30 sent by one mobile device 10 is received by the wireless infrastructure 14, which obtains the address for the intended recipient from information associated with the message 30 (e.g. a data log) or from the message 30 itself. Upon obtaining the recipient's address according to the P2P protocol 84, the wireless infrastructure 14 then routes the message 30 to the recipient associated with the mobile device 10 having such address. The wireless infrastructure 14 typically also provides a delivery confirmation to the original sender, which may or may not be displayed to the user. The destination device can also provide such delivery information. The wireless infrastructure 14 should be capable of routing messages 30 reliably and hold onto the messages 30 until they are successfully delivered. Alternatively, if delivery cannot be made after a certain timeout period, the wireless infrastructure 14 may provide a response indicating a failed delivery. The wireless infrastructure 14 may choose to expire a message 30 if a certain waiting period lapses.

Figure 7:
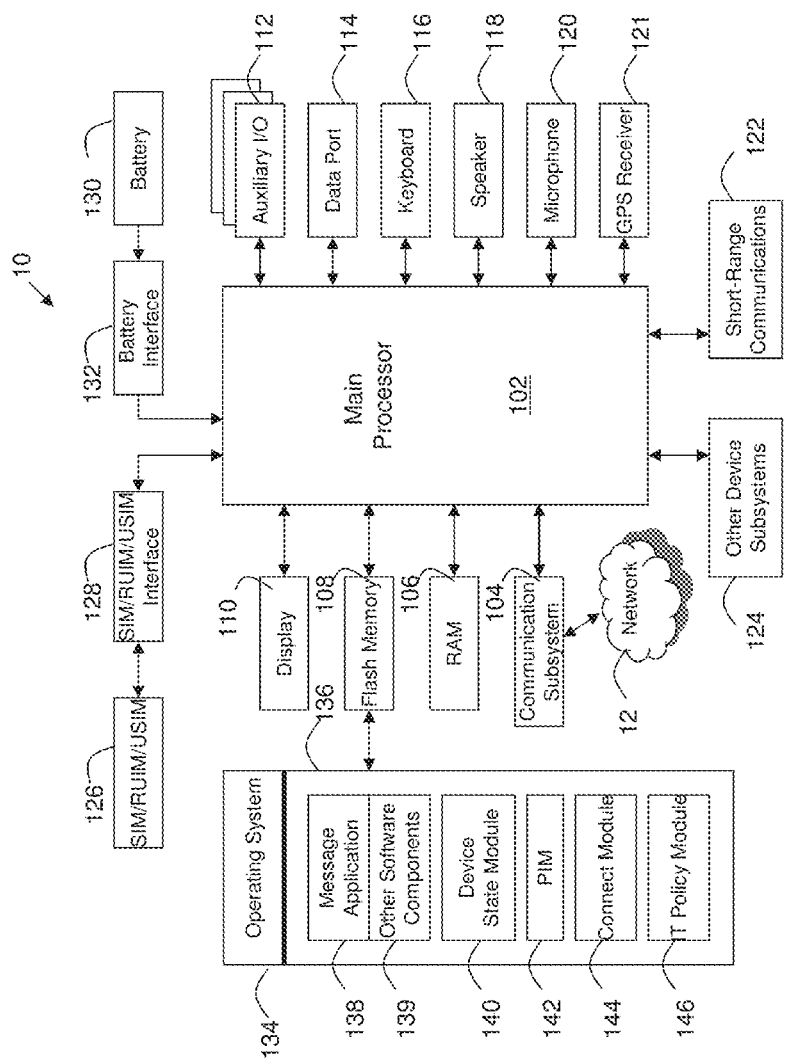
FIG. 7 is a block diagram of an example configuration for a mobile device.

Referring now to FIG. 7, shown therein is a block diagram of an example embodiment of a mobile device 10. The mobile device 10 comprises a number of components such as a main processor 102 that controls the overall operation of the mobile device 10. Communication functions, including data and voice communications, are performed through a communication subsystem 104. The communication subsystem 104 receives messages from and sends messages to a wireless network 12. In this example embodiment of the mobile device 10, the communication subsystem 104 is configured in accordance with the Global System for Mobile Communication (GSM) and General Packet Radio Services (GPRS) standards. The GSM/GPRS wireless network is used worldwide and it is expected that these standards will be superseded eventually by 3G and 4G networks such as Enhanced Data-rates for Global Evolution (EDGE), Universal Mobile Telecommunications System (UMTS) and High-Speed Downlink Packet Access (HSDPA), Long Term Evolution (LTE), Worldwide Interoperability for Microwave Access (Wi-Max), etc. New standards are still being defined, but it is believed that they will have similarities to the network behaviour described herein, and it will also be understood by persons skilled in the art that the embodiments described herein are intended to use any other suitable standards that are developed in the future. The wireless link connecting the communication subsystem 104 with the wireless network 12 represents one or more different Radio Frequency (RF) channels, operating according to defined protocols specified for GSM/GPRS communications. With newer network protocols, these channels are capable of supporting both circuit switched voice communications and packet switched data communications.

The main processor 102 also interacts with additional subsystems such as a Random Access Memory (RAM) 106, a flash memory 108, a display 110, an auxiliary input/output (I/O) subsystem 112, a data port 114, a keyboard 116, a speaker 118, a microphone 120, GPS receiver 121, short-range communications 122 and other device subsystems 124.

Some of the subsystems of the mobile device 10 perform communication-related functions, whereas other subsystems may provide "resident" or on-device functions. By way of example, the display 110 and the keyboard 116 may be used for both communication-related functions, such as entering a text message for transmission over the network 12, and device-resident functions such as a calculator or task list.

The mobile device 10 can send and receive communication signals over the wireless network 12 after required network registration or activation procedures have been completed. Network access is associated with a subscriber or user of the mobile device 10. To identify a subscriber, the mobile device 10 may use a subscriber module. Examples of such subscriber modules include a Subscriber Identity Module (SIM) developed for GSM networks, a Removable User Identity Module (RUIM) developed for CDMA networks and a Universal Subscriber Identity Module (USIM) developed for 3G networks such as UMTS. In the example shown, a SIM/RUIM/USIM 126 is to be inserted into a SIM/RUIM/USIM interface 128 in order to communicate with a network. The SIM/RUIM/USIM component 126 is one type of a conventional "smart card" that can be used to identify a subscriber of the mobile device 10 and to personalize the mobile device 10, among other things. Without the component 126, the mobile device 10 may not be fully operational for communication with the wireless network 12. By inserting the SIM/RUIM/USIM 126 into the SIM/RUIM/USIM interface 128, a subscriber can access all subscribed services. Services may include: web browsing and messaging such as e-mail, voice mail, SMS, and MMS. More advanced services may include: point of sale, field service and sales force automation. The SIM/RUIM/USIM 126 includes a processor and memory for storing information. Once the SIM/RUIM/USIM 126 is inserted into the SIM/RUIM/USIM interface 128, it is coupled to the main processor 102. In order to identify the subscriber, the SIM/RUIM/USIM 126 can include some user parameters such as an International Mobile Subscriber Identity (IMSI). An advantage of using the SIM/RUIM/USIM 126 is that a subscriber is not necessarily bound by any single physical mobile device. The SIM/RUIM/USIM 126 may store additional subscriber information for a mobile device as well, including datebook (or calendar) information and recent call information. Alternatively, user identification information can also be programmed into the flash memory 108.

The mobile device 10 is typically a battery-powered device and includes a battery interface 132 for receiving one or more batteries 130 (typically rechargeable). In at least some embodiments, the battery 130 can be a smart battery with an embedded microprocessor. The battery interface 132 is coupled to a regulator (not shown), which assists the battery 130 in providing power V+ to the mobile device 10. Although current technology makes use of a battery, future technologies such as micro fuel cells may provide the power to the mobile device 10.

The mobile device 10 also includes an operating system 134 and software components 136 to 146 which are described in more detail below. The operating system 134 and the software components 136 to 146 that are executed by the main processor 102 are typically stored in a persistent store such as the flash memory 108, which may alternatively be a read-only memory (ROM) or similar storage element (not shown). Those skilled in the art will appreciate that portions of the operating system 134 and the software components 136 to 146, such as specific device applications, or parts thereof, may be temporarily loaded into a volatile store such as the RAM 106. Other software components can also be included, as is well known to those skilled in the art.

The subset of software applications 136 that control basic device operations, including data and voice communication applications, may be installed on the mobile device 10 during its manufacture. Other software applications include a message application 138 that can be any suitable software program that allows a user of the mobile device 10 to send and receive electronic messages. Various alternatives exist for the message application 138 as is well known to those skilled in the art. Messages that have been sent or received by the user are typically stored in the flash memory 108 of the mobile device 10 or some other suitable storage element in the mobile device 10. In at least some embodiments, some of the sent and received messages may be stored remotely from the mobile device 10 such as in a data store of an associated host system that the mobile device 10 communicates with.

The software applications can further comprise a device state module 140, a Personal Information Manager (PIM) 142, and other suitable modules (not shown). The device state module 140 provides persistence, i.e. the device state module 140 ensures that important device data is stored in persistent memory, such as the flash memory 108, so that the data is not lost when the mobile device 10 is turned off or loses power.

The PIM 142 includes functionality for organizing and managing data items of interest to the user, such as, but not limited to, e-mail, contacts, calendar events, voice mails, appointments, and task items. A PIM application has the ability to send and receive data items via the wireless network 12. PIM data items may be seamlessly integrated, synchronized, and updated via the wireless network 12 with the mobile device subscriber's corresponding data items stored and/or associated with a host computer system. This functionality creates a mirrored host computer on the mobile device 10 with respect to such items. This can be particularly advantageous when the host computer system is the mobile device subscriber's office computer system.

The mobile device 10 may also comprise a connect module 144, and an IT policy module 146. The connect module 144 implements the communication protocols that are required for the mobile device 10 to communicate with the wireless infrastructure and any host system, such as an enterprise system, that the mobile device 10 is authorized to interface with.

The connect module 144 includes a set of APIs that can be integrated with the mobile device 10 to allow the mobile device 10 to use any number of services associated with the enterprise system. The connect module 144 allows the mobile device 10 to establish an end-to-end secure, authenticated communication pipe with a host system (not shown). A subset of applications for which access is provided by the connect module 144 can be used to pass IT policy commands from the host system to the mobile device 10. This can be done in a wireless or wired manner. These instructions can then be passed to the IT policy module 146 to modify the configuration of the device 10. Alternatively, in some cases, the IT policy update can also be done over a wired connection.

The IT policy module 146 receives IT policy data that encodes the IT policy. The IT policy module 146 then ensures that the IT policy data is authenticated by the mobile device 100. The IT policy data can then be stored in the flash memory 106 in its native form. After the IT policy data is stored, a global notification can be sent by the IT policy module 146 to all of the applications residing on the mobile device 10. Applications for which the IT policy may be applicable then respond by reading the IT policy data to look for IT policy rules that are applicable.

Other types of software applications or components 139 can also be installed on the mobile device 10. These software applications 139 can be pre-installed applications (i.e. other than message application 138) or third party applications, which are added after the manufacture of the mobile device 10. Examples of third party applications include games, calculators, utilities, etc.

The additional applications 139 can be loaded onto the mobile device 10 through at least one of the wireless network 12, the auxiliary I/O subsystem 112, the data port 114, the short-range communications subsystem 122, or any other suitable device subsystem 124. This flexibility in application installation increases the functionality of the mobile device 10 and may provide enhanced on-device functions, communication-related functions, or both. For example, secure communication applications may enable electronic commerce functions and other such financial transactions to be performed using the mobile device 10.

The data port 114 enables a subscriber to set preferences through an external device or software application and extends the capabilities of the mobile device 10 by providing for information or software downloads to the mobile device 10 other than through a wireless communication network. The alternate download path may, for example, be used to load an encryption key onto the mobile device 10 through a direct and thus reliable and trusted connection to provide secure device communication.

The data port 114 can be any suitable port that enables data communication between the mobile device 10 and another computing device. The data port 114 can be a serial or a parallel port. In some instances, the data port 114 can be a USB port that includes data lines for data transfer and a supply line that can provide a charging current to charge the battery 130 of the mobile device 10.

The short-range communications subsystem 122 provides for communication between the mobile device 10 and different systems or devices, without the use of the wireless network 12. For example, the subsystem 122 may include an infrared device and associated circuits and components for short-range communication. Examples of short-range communication standards include standards developed by the Infrared Data Association (IrDA), Bluetooth, and the 802.11 family of standards developed by IEEE.

In use, a received signal such as a text message, an e-mail message, or web page download may be processed by the communication subsystem 104 and input to the main processor 102. The main processor 102 may then process the received signal for output to the display 110 or alternatively to the auxiliary I/O subsystem 112. A subscriber may also compose data items, such as e-mail messages, for example, using the keyboard 116 in conjunction with the display 110 and possibly the auxiliary I/O subsystem 112. The auxiliary subsystem 112 may comprise devices such as: a touch screen, mouse, track ball, infrared fingerprint detector, or a roller wheel with dynamic button pressing capability. The keyboard 116 is an alphanumeric keyboard and/or telephone-type keypad. However, other types of keyboards may also be used, such as a virtual or "soft" keyboard rendered as images on a touch screen. A composed item may be transmitted over the wireless network 12 through the communication subsystem 104.

For voice communications, the overall operation of the mobile device 10 in this example is substantially similar, except that the received signals are output to the speaker 118, and signals for transmission are generated by the microphone 120. Alternative voice or audio I/O subsystems, such as a voice message recording subsystem, can also be implemented on the mobile device 10. Although voice or audio signal output is accomplished primarily through the speaker 118, the display 110 can also be used to provide additional information such as the identity of a calling party, duration of a voice call, or other voice call related information.

It will be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the mobile device 10, any component of or related to the wireless infrastructure 14, etc., or accessible or connectable thereto. Any application or module herein described may be implemented using computer readable/executable instructions that may be stored or otherwise held by such computer readable media.

Turning now to FIG. 8, example computer executable instructions are shown that may be executed by the parties indicated for developing, registering and deploying a new application 36 to operate on the application platform 34. At 200, the admin server 18 provides a software development kit (SDK) and access to APIs and other data that enables development of a P2P compatible application 36 to be used on the application platform 34. It can be appreciated that the SDK and APIs can also or instead be provided by the application distribution service 22 or any other suitable entity. At 202, a developer 26 obtains the SDK and APIs, e.g. by purchasing a license therefor, and develops the P2P application 36 at 204. As shown in FIG. 8, a subroutine A may be included in the development stage at 204. FIG. 9 illustrates the subroutine A, which enables the developer 26 to obtain a temporary application ID at 222. This allows the developer 26 to temporarily run the application 36 using the wireless infrastructure 14 in order to test or perform other tasks associated with the development process. As will be discussed later, the subroutine A may also be invoked by the P2P platform 32 or admin server 18 if an application 36 that has been downloaded does not have a registered application ID. Use of the application 36 may then be permitted at 224, e.g. for testing, and the temporary ID would expire at 226, e.g. after a predetermined number of days or months. The temp ID may be issued and obtained from the admin server 18 and the admin server 18 can stored the temp ID and track the expiry date so that the temp ID goes out of service at the appropriate time or after a particular number of uses, number of users, etc.

Returning to FIG. 8, once the application 36 has been developed, the developer 26 may then initiate a registration process with the admin server 18 at 206. The registration process enables the admin server 18 to verify the integrity of the application 36, scan the application 36 for malicious code or viruses, and perform any other validation or verification procedures required by the wireless infrastructure 14 and P2P system 16. The registration process also enables the admin server 18 to control the generation of application IDs to ensure that they are unique. Moreover, by keeping track of application IDs in the list 48, the admin server 18 can enable application platforms 34 to register newly downloaded copies of the application 36. The application 36 is verified and registered at 208 and a new unique application ID is assigned and recorded in the list 48 at 210. The unique application ID is then also released to the developer 26 at 212 to enable the developer 26 to include or provide an indication of the application ID in the download. The developer 26 thus obtains the application ID at 214 and provides the application 36 and its unique ID to the application distribution service 22 at 216. The application distribution service 22 then obtains the application 36 and unique ID at 218 and makes them available for distribution (e.g. download through a service or browser) at 220. It can be appreciated that the developer 26 may also or instead provide the application 36 and unique ID to a trusted $3^{rd}$ party application service 24 or other entity.

Figure 10:
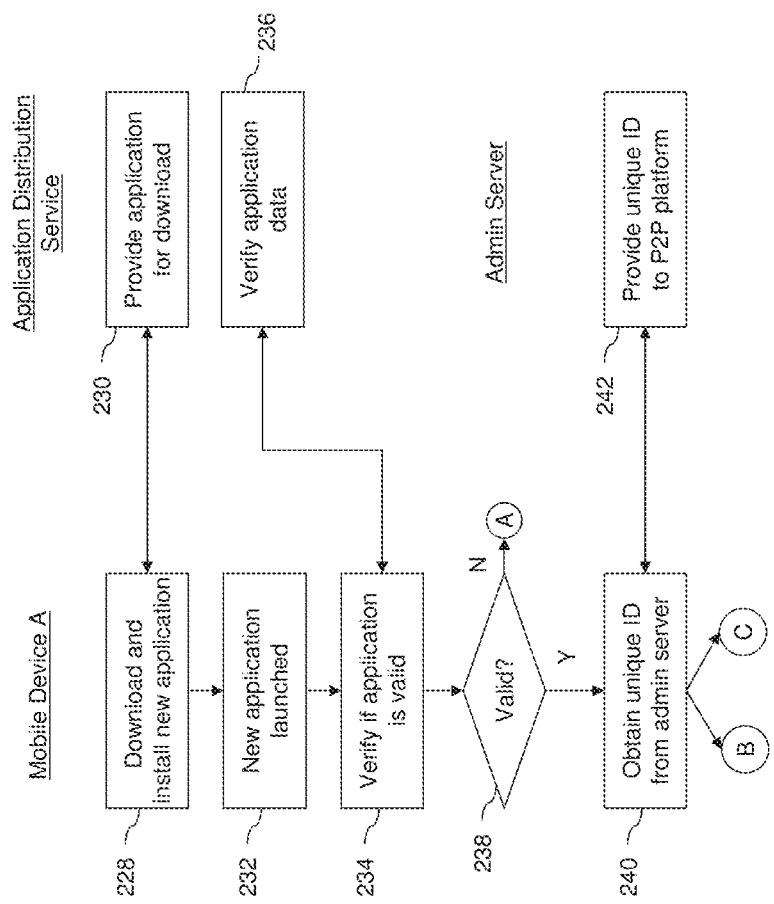
FIG. 10 is a flow chart illustrating an example set of computer executable instructions for downloading and installing a new application for use on the application platform.

Once the application 36 becomes available (e.g. via the application distribution service 22), it may be downloaded by a mobile device 10, e.g. mobile device A as shown in FIG. 10. In the example shown in FIG. 10, the new application 36 is downloaded and installed at 228 while being provided for download by the application distribution service 22 at 230. Once downloaded and installed, the mobile device 10 may then launch the new application 36 at 232, e.g. upon detection selection of an icon displayed by the mobile device 10. The mobile device 10 then verifies if the application is valid at 234. This may be done by having the application platform 34 and/or the P2P platform 32 verify the application details it has from the download with the admin server at 236. The application platform 34 may also use the P2P platform 32 to obtain information to verify that the application 36 is valid for use with the P2P system 16. This may be done by the P2P platform 32 obtaining application details from the application distribution service 22. For example, the application platform 34 may check a hashcode to ensure that the application has not be tampered with. If the application is not valid at 238, e.g. the application is not recognized by the application distribution service 22 (or is not yet released for common use—e.g. beta testing phase, etc.), a temp ID may be issued by initiating subroutine A described above and shown in FIG. 9. If the application 36 is valid at 238, the unique ID is provided by the admin server 18 at 242 and obtained by the application platform 34 via the P2P platform 32 at 240.

Downloading a new application 36 may be considered an event which changes or updates the platform data 72 and thus triggers an update to be sent by the application platform 34 to other application platforms 34 for those contacts in the contact list 42. It can be appreciated that, using the P2P platform 32, the application platform 34 can determine the version of the P2P platform 32 running on the contacts' mobile devices 10 as well as whether or not they have an application platform 34 installed. This enables the application platform 34 to minimize the number of P2P messages 30 and thus the traffic in the wireless infrastructure 14. As shown in FIG. 10, upon installing and registering a new application 36, routines B and C may be initiated.

Figure 11:
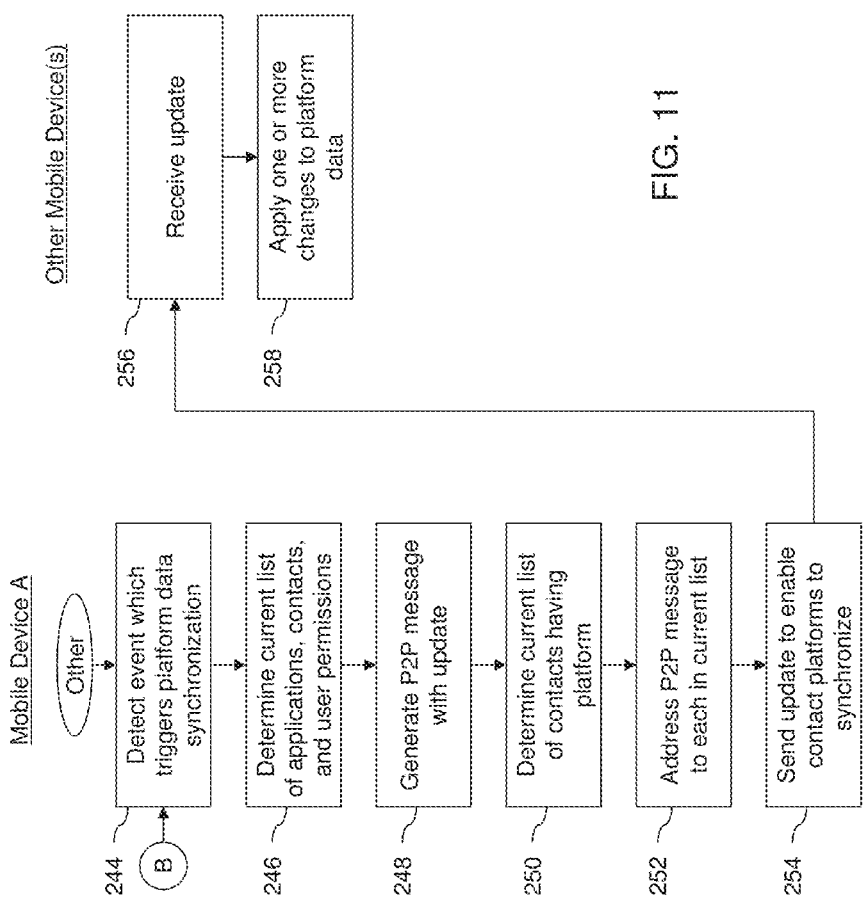
FIG. 11 is a flow chart illustrating an example set of computer executable instructions for generating and sending an application platform data update to other mobile devices.

Routine B is shown in FIG. 11, however it can be appreciated that other events may trigger the operations shown therein. In this example, the event that triggers a platform data synchronization at 244 is the addition of the new application 36 in FIG. 10. Other events that can trigger the operations beginning at 244 include, without limitation: uninstalling an existing application 36, back-up restore operation, addition or removal of a contact, permission updates, device switch (i.e. migration to new mobile device 10), etc. By continually updating other application platforms 34 within the mobile device's sphere of contacts, the platform data 72 can be kept up-to-date to allow, among other things, the user to quickly (and perhaps automatically) see who in their contact list 42 has the same application 36 that they just downloaded. This enables that user to immediately invite others to join, for example, a multi-player game, a group (file sharing, music sharing, etc.), participate in mobile commerce (e.g. fund transfer), etc. Conversely by knowing which of the contacts in the contact list 42 do not have the application 36 just downloaded, the user can also determine who may wish to have that application 36 and can initiate an invitation to download the application 36 as will be explained in greater detail below.

Upon detecting an event which triggers a synchronization of the platform data 72 at 244, the application platform 34 then determines one or more of the current contact list 42, list of applications 80, and permissions 78 at 246. This allows the application platform 34 to identify what needs to be updated. It can be appreciated that each change to the platform data 72, contact list 42, or user profiles 40 may trigger an update as shown in FIG. 11, or multiple updates can be included in the same message. For example, certain changes may immediately trigger updates whereas others may be cached until a higher priority update is detected in order to minimize the number of P2P messages 30 being sent. A P2P message 30 comprising updated platform data 72 is then generated at 248. If such data is available, the application platform 34 may then determine at 250, which of the contacts in the contact list 42 have an application platform 34 and thus need to be updated. The P2P message 30 is then addressed to the appropriate contacts at 252 and the update is sent to the contacts at 254 to enable their application platforms 34 to synchronize their platform data 72. By utilizing the P2P system 16, only one P2P message 30 needs to be sent and can be multicast to the set of recipients as shown in FIG. 2. The other mobile devices 10 would thus receive the update at 256 and apply the one or more changes to the platform data 72 (which would pertain to the contact that provides the update) at 258.

Figure 12:
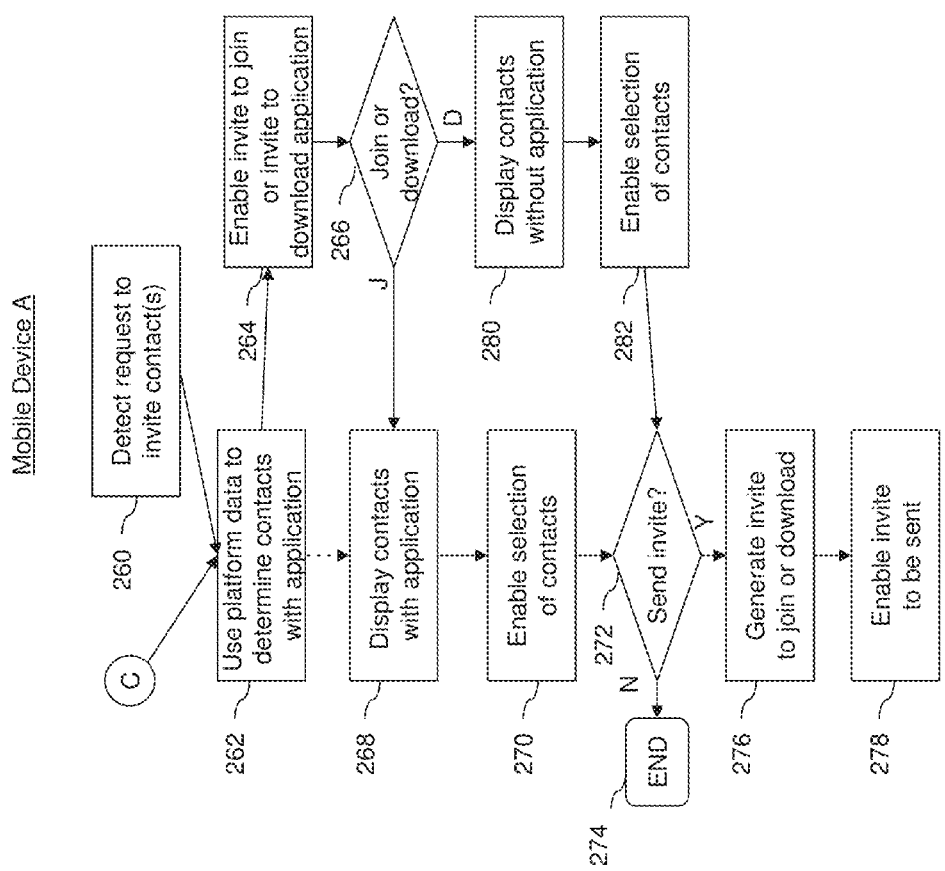
FIG. 12 is a flow chart illustrating an example set of computer executable instructions for enabling the generation of application invite messages.

In addition to triggering an update by invoking routine B, which initiates the set of instructions shown in FIG. 11, by installing a new application 36 as shown in FIG. 10, the application platform 34 can also initiate routine C in order to enable the user of the mobile device 10 to prepare invites, since the P2P platform 32 and/or application platform 34 should already known which of their contacts already has the same application 36 that has just been installed. It can be appreciated that an invite can also be initiated manually by the user, which causes the application platform 34 to detect a request at 260 to invite a contact to a particular application 36. An invite procedure that may be initiated through routine C or through detecting a user input at 260 is shown in FIG. 12. As shown in FIG. 12, upon determining that a new application 36 has been installed, or detecting an invite request, the application platform 34 can use the platform data 72 to determine contacts in the contact list 42 that have the same application 36 at 262. This information may then be used to enable the user to choose whether to invite those contacts that also have the application 36 to join in the application 36 or to invite those contacts that do not have the application 36 to download it at 264. If the user selects to invite one or more contacts to join the application 36 at 266, the contacts with the application 36 are displayed, e.g. as shown in FIG. 15.

It can be appreciated that in some circumstances, e.g. when triggered by routine C, the application platform 34 can be operable to automatically perform operations 262 and 268 to enable the user to immediately determine which if any of those contacts they wish to invite to join. In either case, upon displaying those contacts who already have the application 36 at 268, the application platform 34 then enables the user to select one or more contacts at 270. For example, as shown in FIG. 15, a filtered list 302 of those contacts with the application 36 can be displayed with checkboxes. A filter button 304 can also be provided to enable the user to instead change to a filtered list 306 of contacts without the application as shown in FIG. 16, which indicates this in the filter button 308. The application platform 34 then determines at 272 if an invite is to be sent (e.g. if the user has confirmed their selections). If not, the process ends at 274. If an invite is to be sent, the application platform 34 then generates an invite to join at 276 and enables the invite to be sent at 278. It can be appreciated that the filtered lists 302, 306 shown in FIGS. 15 and 16 may be automatically chosen based on a selection detected at 266 (e.g. from a menu or other UI providing such an option). In other embodiments, a contact selector UI 370 shown in FIG. 20 may be invoked at 264 to enable the user to utilize a filter tool 372 to select either contacts with the application 374 or contacts not having the application 376, which effectively determines what type of invite to send. In the example shown in FIG. 20, a list of contacts 378 is displayed (according to the filtered selection or all contacts if no filtering is selected). Each contact in the list 378 has a checkbox 390 to enable the user to select specific contacts. A Show selected contacts only checkbox 382 may also be provided to further reduce the list 378 based on which contacts have been checked. A done button 384 is then used to confirm the selections.

Figures 15, 16:
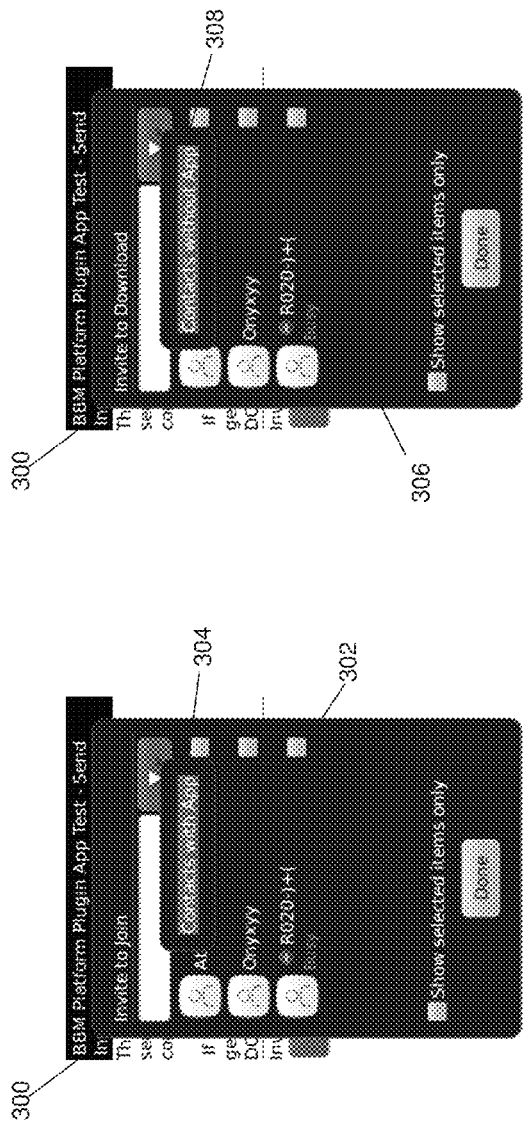
FIG. 15 is a screen shot of an example user interface (UI) for sending an invitation to join an application.
FIG. 16 is a screen shot of an example UI for sending an invitation to download an application.
Figure 20:
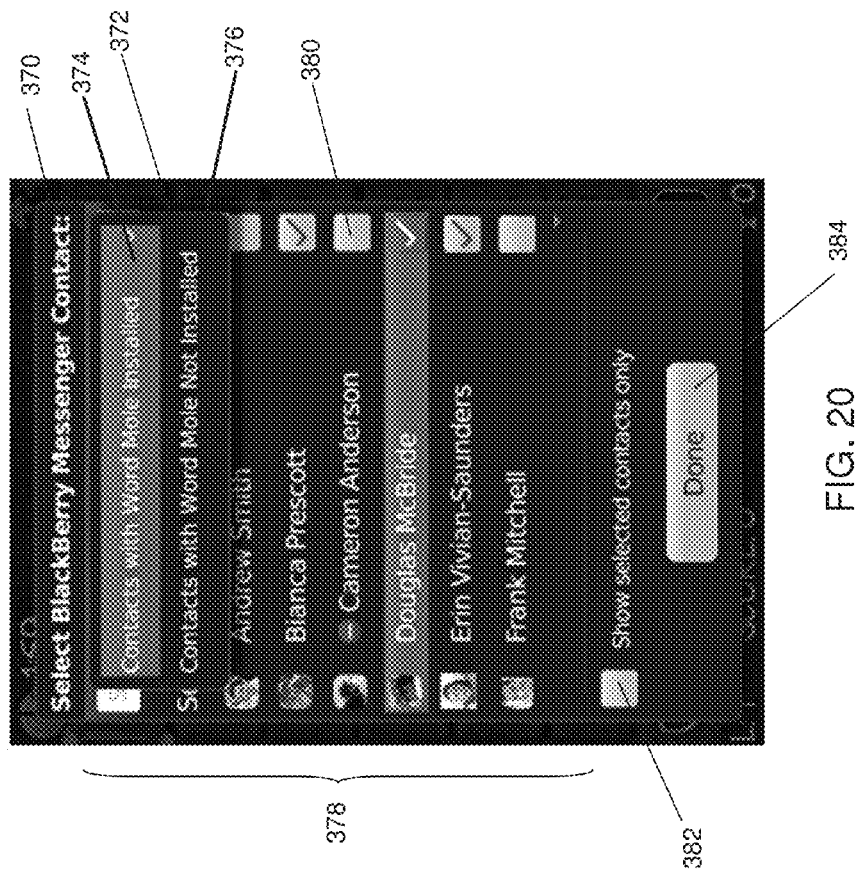
FIG. 20 is a screen shot of an example UI for a contact selector tool.

Returning to FIG. 12, if the user has selected to send an invite to download to one or more contacts that do not have the application 36, the contacts without the application 36 may displayed at 280 (e.g. as shown in FIG. 16 or FIG. 20). The application platform 34 may then enable selection of one or more of these contacts at 282. Operations 272, 274, 276, and 278 may then be repeated, however, the invite would provide the contact with an invite to download the application 36 rather than join in its activities.

Figure 13:
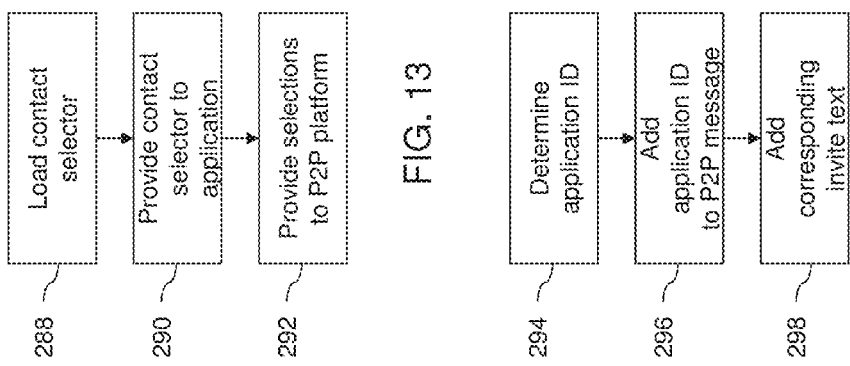
FIG. 13 is a flow chart illustrating an example set of computer executable instructions for utilizing a contact selector module.

It can be appreciated that if the application platform 34 is enabling the invite to be initiated from within the application 36, to protect the platform data 72, the application platform 34 can utilize the contact selector UI 370 of FIG. 20, as shown in FIG. 13. The contact selector 74 is loaded at 288 and provided to or within the application 36 at 290 to enable the UI 370 to be presented to the user, e.g. as shown in FIG. 20. The selections detected from the contact selector UI 370 would then be provided to the P2P platform 32 in generating the invite at 276. In this way, the application 36 does not need to know any information other than that the particular contacts exist in the contact list 42 and that they either have or do not have that particular application 36. In other words, the contact list data provided by the contact selector can include limited information associated with each of the contacts, such as by restricting such information to a contact identifier (e.g., name), and an indication that the contact has one or more applications on their corresponding mobile device.

Figure 14:
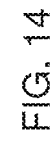
FIG. 14 is a flow chart illustrating an example set of computer executable instructions for generating the invite message.

Further detail of one example process to generate the invite is shown in FIG. 14. At 294, the application ID for the particular application 36 is determined (e.g. by the application platform 34). The application ID is then added to the ID field 60 in the P2P message 30 that is to transport the invite at 296. The appropriate invite text is then added to the P2P message 30 at 298. For example, if an invite to join is being sent, the body 52 of the message 30 may include a message such as: "User A invites you to play game X". For an invite to download, the message may indicate: "User A invites you to download game X". It be appreciated that since each application 36 comprises a unique ID in the ID field 60, no link or executable file needs to be sent with an invite to download, thus reducing bandwidth in the wireless infrastructure 14. Using the application ID, the recipient application platform 34 can generate its own link or selection mechanism to then initiate a download by contacting the application distribution service 22.

Figure 17:
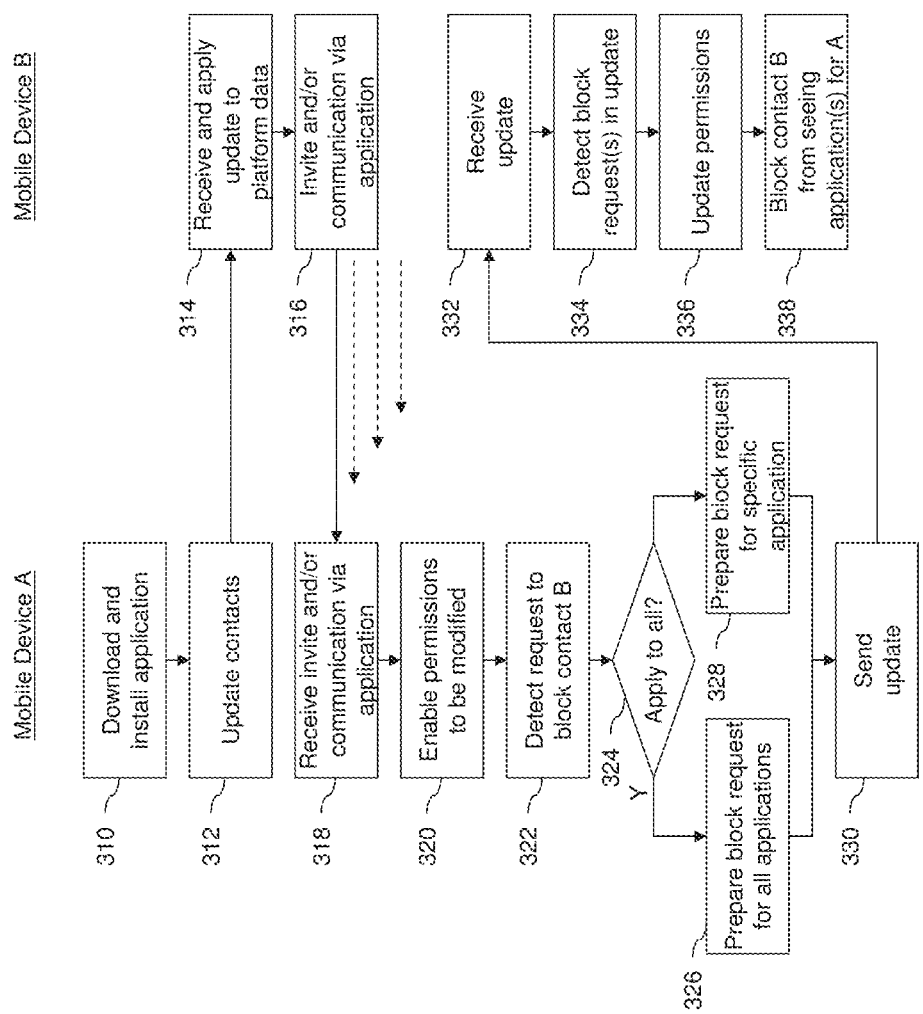
FIG. 17 is a flow chart illustrating an example set of computer executable instructions for updating and applying new permission settings.

In addition to continually updating each other's application platforms 34, users may also wish to impose various permissions. For example, a user may wish to block notifications or invites for particular applications and/or from particular contacts. FIG. 17 illustrates an example process for updating a permission to prohibit communications for a particular application. In the example shown in FIG. 17, it is assumed that Mobile Device A has downloaded and installed an application at 310, and this information is provided as an update to their contacts at 312. Having received this information at 314, Mobile Device B may initiate various invites or begin sending notifications or other data, depending on the nature of the application 36. Several dashed lines are shown in FIG. 17 to illustrate that in this example, the communications from Mobile Device B are frequent and thus undesirable in this case. The communications are received by Mobile Device A at 318.

At some point, typically after at least one notification or other communication has been received in connection with the application 36, Mobile Device A detects, for example, the initiation of a permissions UI (not shown) to enable permissions to be modified at 320. In this example, Mobile Device A determines at 322 that a request to block notifications from contact B (e.g. for all applications 36 or just that particular application 36). The application platform 34 for Mobile Device A may then determine whether or not the user wishes to have all notifications in all applications 36 applied to Mobile Device B. If so, a block request is prepared at 326 for all applications 36. If not, a block request is prepared at 328 for that particular application. It can be appreciated that the block request may be considered an event that triggers the operations in FIG. 11 and/or may otherwise utilize one or more of these operations in preparing a P2P message 30 to update Mobile Device B regarding a change in permissions. It can be appreciated that, although the example in FIG. 17 illustrates a block request being prepared for a particular contact, similar block requests can also be prepared that are applied to multiple contacts. For example, a user may wish to block all notifications from all contacts for a particular application, in which case the block request would be sent to each contact in the contact list 34 and applied accordingly.

The block request that has been prepared at either 326 or 328 is then sent as an update, using a P2P message 30 at 330. It can be seen that rather than have Mobile Device A continually drop messages 30 received from Mobile Device B for that application 36, by using the application platforms 34, the messages 30 originating from Mobile Device B for the application 36 can be stopped at the source. As such, Mobile Device B receives the update at 332 and detects a block request therein at 334. The application platform 34 at Mobile Device B updates its permissions 78 at 336 and thereafter blocks contact B from seeing that application for user A. By simply removing user A from the list of those contacts for B that have the application 36, user A's intentions do not need to be explained, contact B would simply not be able to send messages for that application 36. It can be appreciated that other mechanisms can be used to convey to contact B that they are blocked from communicating with user A for the application or applications 36. For example, a notification may be displayed to contact B when they attempt to invite or otherwise communicate with user A.

In addition to enabling users to specify permissions for communicating with their contacts, the admin server 18 can also exercise control over the applications 36 via the P2P system 16. FIG. 18 illustrates an example process, wherein the admin server 18 receives a request or otherwise determines at 340 that there is a need to control a particular application 36. For example, the admin server 18 may discover that the application has corrupt or malicious code that they wish to stop from spreading. In addition to disabling or unregistering the associated application ID to prevent further copies from being registered, the P2P system 16 can be used to push down control messages to the application platforms 34 to control the existing downloads. The admin server 18 would determine the application ID for that application 36 at 342 and prepare the application control message at 344. The control message is then sent to the P2P platforms 32 at 346, which can pass the control message to the application platform 34 or other entity such as the IT policy module 146. The mobile devices 10 having application platforms 34 then receive the control message at 350 and apply the control message at 352 which would initiate an action such as an uninstall, temporary disablement, upgrade, etc. In this example, the mobile device 10 issues an acknowledgement of the outcome of applying the control message at 354, which is received and logged by the admin server 18 at 348.

It can be appreciated that the admin server 18 can determine which mobile devices 10 to send the control message to in various ways. For example, the admin server 18 can have the P2P system 16 determine which mobile devices 10 have an application platform 34 and, if available, which have that application 36. If this is not known, each mobile device 10 associated with the P2P system 16 can be pinged or simply given the control message and if it is applicable (i.e. that device has the application 36), it would be applied or dropped.

In some embodiments, in order to reduce the burden on the admin server 18, i.e. to avoid the admin server 18 having to maintain any list or otherwise have to acquire this information, the P2P system 16 may be used to determine when a control message is required to be sent. For example, the P2P network transport layer can be operable to block any P2P messages 30 which indicate a particular ID in the ID field 60. A block list can be maintained, which can be updated, for example, by receiving requests to block certain applications. In such cases, when the P2P system 16 detects a blocked ID in the ID field 60, it can send a termination command to the associated mobile device 10 via the admin server 18.

Various permissions can be applied not only to block incoming messages 30 for a particular application, but also to hide the existence of a particular application 36 from a user's contacts. FIG. 19 illustrates an example process for hiding an application 36. At 356, the application platform 34 detects a request to hide a particular application 36 and at 358 the application platform 34 updates the platform data 72 to block inclusion of the presence of that application 36 from being included in platform data synchronizations. Alternatively, or in addition (if required) as shown in dashed lines, the application platform 34 can prepare and send an update at 360 to other application platforms to indicate that the application 36 should be hidden to those contacts. This may be required, for example, if the application 36 was previously visible to the contacts. In this case, the update sent at 360 can cause the application platforms 34 to immediately remove this information (or otherwise suppress it) to effectively hide this information across the contact list 42.

Therefore, a method and system are provided for enabling applications on a mobile device to utilize a peer-to-peer platform on the mobile device. The method comprises providing an interface between an application and a peer-to-peer (P2P) platform on the mobile device; obtaining data from the application; using the P2P platform to include the data from the application in a P2P message; and sending the P2P message to another mobile device to enable a complementary application on the other mobile device to utilize the data from the application. The system may provide a computer readable storage medium or memory in a mobile device with instructions for performing the above method.

Although the above has been described with reference to certain specific embodiments, various modifications thereof will be apparent to those skilled in the art without departing from the scope of the claims appended hereto.

The invention claimed is:

1. A method of operating a peer-to-peer messaging service using a peer-to-peer messaging server, the method comprising the peer-to-peer messaging server:
enabling an application platform on a mobile device to interface between at least one application on the mobile device and the peer-to-peer messaging service to enable the at least one application to exchange data with other mobile devices using the peer-to-peer messaging service using data available to the mobile device via the peer-to-peer messaging service, wherein the peer-to-peer messaging server is external to the mobile device and the other mobile devices, and wherein the application is a non-peer-to-peer application and the application platform is a non-peer-to-peer application platform;
providing access to the peer-to-peer messaging service via the application platform to enable the application platform to generate a first peer-to-peer message comprising a first update detected by the mobile device, the first update being associated with the application platform, wherein the first update is initiated after detecting addition of a new application;
providing access to the data available to the mobile device via the peer-to-peer messaging service to enable at least one contact having a corresponding application platform on a corresponding mobile device to be determined, wherein the corresponding application platform is a non-peer-to-peer application platform, and wherein the peer-to-peer messaging server is external to the mobile device and the corresponding mobile device;
enabling the first peer-to-peer message addressed to the at least one contact to be sent to the corresponding mobile device to enable the corresponding application platform to be updated based on the first update, the corresponding application platform on the corresponding mobile device also operable to interface with a corresponding peer-to-peer messaging service on the corresponding mobile device; and
sending an invite to one or more of the at least one contact pertaining to the new application.

2. The method of claim 1, further comprising:
enabling a second peer-to-peer message sent from one of the at least one contact to be received by the mobile device, the second peer-to-peer message comprising a second update associated with the corresponding application platform on the corresponding mobile device to enable data associated with the application platform on the mobile device to be updated according to the second update.

3. The method of claim 1, wherein the first update is initiated after detecting any one or more of an addition of a new application, uninstalling an existing application, a backup restoration operation, an addition or removal of a contact, a permission update, and a device switch.

4. The method of claim 1, wherein the invite is to communicate via the new application, the method further comprising enabling the mobile device to determine one or more of the at least one contact having the new application.

5. The method of claim 1, wherein the first update comprises a request to block the at least one contact from communicating with the mobile device using one or more of the at least one application.

6. The method of claim 5, wherein the request to block enables the corresponding application platform to block peer-to-peer messages associated with the one or more of the at least one application.

7. The method of claim 5, wherein the request to block enables the corresponding application platform to hide presence of the one or more of the at least one application on the mobile device from the at least one contact.

8. The method of claim 1, further comprising enabling a contact list data from a peer-to-peer application associated with the peer-to-peer messaging service to be accessed by the mobile device to enable the first peer-to-peer message to be addressed.

9. The method of claim 8, wherein the contact list data comprises limited information associated with each of the at least one contact.

10. The method of claim 9, wherein the contact list data is restricted to a contact identifier and an indication that the contact has one or more applications on the corresponding mobile device.

11. The method of claim 1, wherein each of the at least one application has an associated application identifier, the application identifier enabling the application platform to identify applications supported thereby.

12. A non-transitory computer readable storage medium comprising computer executable instructions for operating a peer-to-peer messaging service using a peer-to-peer messaging server, the computer executable instructions comprising instructions for the peer-to-peer messaging server:
enabling an application platform on a mobile device to interface between at least one application on the mobile device and the peer-to-peer messaging service to enable the at least one application to exchange data with other mobile devices using the peer-to-peer messaging service using data available to the mobile device via the peer-to-peer messaging service, the peer-to-peer messaging server is external to the mobile device and the other mobile devices, and wherein the application is a non-peer-to-peer application and the application platform is a non-peer-to-peer application platform;

providing access to the peer-to-peer messaging service via the application platform to enable the application platform to generate a first peer-to-peer message comprising a first update detected by the mobile device, the first update being associated with the application platform, wherein the first update is initiated after detecting addition of a new application;

providing access to the data available to the mobile device via the peer-to-peer messaging service to enable at least one contact having a corresponding application platform on a corresponding mobile device to be determined, wherein the corresponding application platform is a non-peer-to-peer application platform, and wherein the peer-to-peer messaging server is external to the mobile device and the corresponding mobile device; and enabling the first peer-to-peer message addressed to the at least one contact to be sent to the corresponding mobile device to enable the corresponding application platform to be updated based on the first update, the corresponding application platform on the corresponding mobile device also operable to interface with a corresponding peer-to-peer messaging service on the corresponding mobile device; and sending an invite to one or more of the at least one contact pertaining to the new application.

13. The non-transitory computer readable storage medium of claim 12, further comprising instructions for:

enabling a second peer-to-peer message sent from one of the at least one contact to be received by the mobile device, the second peer-to-peer message comprising a second update associated with the corresponding application platform on the corresponding mobile device to enable data associated with the application platform on the mobile device to be updated according to the second update.

14. The non-transitory computer readable storage medium of claim 12, wherein the first update is initiated after detecting any one or more of an addition of a new application, uninstalling an existing application, a back-up restoration operation, an addition or removal of a contact, a permission update, and a device switch.

15. The non-transitory computer readable storage medium of claim 12, wherein the invite is to communicate via the new application, and further comprising instructions for enabling the mobile device to determine one or more of the at least one contact having the new application.

16. The non-transitory computer readable storage medium of claim 12, wherein the first update comprises a request to block the at least one contact from communicating with the mobile device using one or more of the at least one application.

17. The non-transitory computer readable storage medium of claim 16, wherein the request to block enables the corresponding application platform to block peer-to-peer messages associated with the one or more of the at least one application.

18. The non-transitory computer readable storage medium of claim 16, wherein the request to block enables the corresponding application platform to hide presence of the one or more of the at least one application on the mobile device from the at least one contact.

19. The non-transitory computer readable storage medium of claim 12, further comprising instructions for enabling a contact list data from a peer-to-peer application associated with the peer-to-peer messaging service to be accessed by the mobile device to enable the first peer-to-peer message to be addressed.

20. The non-transitory computer readable storage medium of claim 19, wherein the contact list data comprises limited information associated with each of the at least one contact.

21. The non-transitory computer readable storage medium of claim 20, wherein the contact list data is restricted to a contact identifier and an indication that the contact has one or more applications on the corresponding mobile device.

22. The non-transitory computer readable storage medium of claim 12, wherein each of the at least one application has an associated application identifier, the application identifier enabling the application platform to identify applications supported thereby.

23. A peer-to-peer messaging server comprising a processor, memory, and a peer-to-peer messaging service, the memory comprising computer executable instructions that when executed by the processor operate the processor for:

enabling an application platform on a mobile device to interface between at least one application on the mobile device and the peer-to-peer messaging service to enable the at least one application to exchange data with other mobile devices using the peer-to-peer messaging service using data available to the mobile device via the peer-to-peer messaging service, wherein the peer-to-peer messaging server is external to the mobile device and the other mobile devices, and wherein the application is a non-peer-to-peer application and the application platform is a non-peer-to-peer application platform;

providing access to the peer-to-peer messaging service via the application platform to enable the application platform to generate a first peer-to-peer message comprising a first update detected by the mobile device, the first update being associated with the application platform, wherein the first update is initiated after detecting addition of a new application;

providing access to the data available to the mobile device via the peer-to-peer messaging service to enable at least one contact having a corresponding application platform on a corresponding mobile device to be determined, wherein the corresponding application platform is a non-peer-to-peer application platform, and wherein the peer-to-peer messaging server is external to the mobile device and the corresponding mobile device; and enabling the first peer-to-peer message addressed to the at least one contact to be sent to the corresponding mobile device to enable the corresponding application platform to be updated based on the first update, the corresponding application platform on the corresponding mobile device also operable to interface with a corresponding peer-to-peer messaging service on the corresponding mobile device; and sending an invite to one or more of the at least one contact pertaining to the new application.

* * * * *